US011223187B2

(12) United States Patent
 Aimu

(10) Patent No.: US 11,223,187 B2
(45) Date of Patent: Jan. 11, 2022

(54) HARNESS PROTECTOR AND HARNESS ASSEMBLY

(71) Applicant: SUMITOMO WIRING SYSTEMS, LTD., Mie (JP)

(72) Inventor: Kazunori Aimu, Mie (JP)

(73) Assignee: SUMITOMO WRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/757,787

(22) PCT Filed: Nov. 5, 2018

(86) PCT No.: PCT/JP2018/040964
 § 371 (c)(1),
 (2) Date: Apr. 21, 2020

(87) PCT Pub. No.: WO2019/093264
 PCT Pub. Date: May 16, 2019

(65) Prior Publication Data
 US 2021/0273433 A1 Sep. 2, 2021

(30) Foreign Application Priority Data
 Nov. 8, 2017 (JP) .............................. JP2017/215320

(51) Int. Cl.
 *H02G 3/14* (2006.01)
 *H02G 3/04* (2006.01)
 *B60R 16/02* (2006.01)
(52) U.S. Cl.
 CPC ....... *H02G 3/0468* (2013.01); *B60R 16/0215* (2013.01); *H02G 3/14* (2013.01)
(58) Field of Classification Search
 CPC ..... H02G 2/0468; H02G 3/14; B60R 16/0215
 (Continued)

(56) References Cited

U.S. PATENT DOCUMENTS

| 8,907,215 | B2* | 12/2014 | Sakai | ................... | H02G 3/0691 |
|  |  |  |  |  | 174/61 |
| 2005/0217888 | A1* | 10/2005 | Arai | ..................... | H02G 3/0418 |
|  |  |  |  |  | 174/72 A |
| 2009/0050350 | A1* | 2/2009 | Katsumata | .......... | H02G 3/0691 |
|  |  |  |  |  | 174/135 |

FOREIGN PATENT DOCUMENTS

| JP | 2003-153411 A | 5/2003 |
| JP | 2004-072932 A | 3/2004 |

(Continued)

OTHER PUBLICATIONS

International Search Report dated Nov. 27, 2018 for WO 2019/093264 A1 (2 pages).

*Primary Examiner* — Timothy J Thompson
*Assistant Examiner* — Michael F McAllister
(74) *Attorney, Agent, or Firm* — Abelman, Frayne & Schwab

(57) ABSTRACT

Provided are a harness protector 10 that is mounted, in use, to a wire harness 18 including, on an outer circumference thereof, a corrugated tube 20 including a series of ridge portions 34 and valley portions 36, the harness protector including wire lead-out ports 28*a* to 28*h* serving as an inlet/outlet of the wire harness 18, wherein protrusions 42*a* and 42*b* and a stopper 46 protrude from inner circumferential surfaces 38 and 40 of the wire lead-out ports 28*a* to 28*h*, the protrusions 42*a* and 42*b* are configured to be fitted to the valley portions 36, and the stopper 46 has a larger width dimension at a protruding end face 52 or a basal portion thereof than a width dimension of the valley portions 36, and a harness assembly including the wire harness 18.

19 Claims, 5 Drawing Sheets

(58) Field of Classification Search
USPC .................................................. 174/72 A
See application file for complete search history.

(56) References Cited

FOREIGN PATENT DOCUMENTS

| | | | | |
|---|---|---|---|---|
| JP | 2004072932 | * | 3/2004 | ............... H02G 3/04 |
| JP | 2012-217286 A | | 11/2012 | |

* cited by examiner

HARNESS PROTECTOR AND HARNESS ASSEMBLY

CROSS REFERENCE TO RELATED APPLICATIONS

This application is a national phase of PCT application No. PCT/JP2018/040964, filed on 5 Nov. 2018, which claims priority from Japanese patent application No. 2017-215320, filed on 8 Nov. 2017, all of which are incorporated herein by reference.

TECHNICAL FIELD

The present invention relates to a harness protector and a harness assembly.

BACKGROUND

Conventionally, vehicle-mounted components such as protectors and electrical junction boxes have been provided with wire lead-out ports for holding wire harnesses routed therein and leading the wire harnesses to the outside. As described in JP 2004-72932A (Patent Document 1), arc-shaped fitting projections configured to be fitted into valley portions of a corrugated tube externally fitted to a wire harness are provided protruding from the inner circumferential surface of the opening end portion of the wire lead-out port. As a result of the arc-shaped fitting projections being fitted to the valley portions of the corrugated tube when the corrugated tube of the wire harness is mounted to the wire lead-out port, the corrugated tube is aligned with, and fixed to the wire lead-out port.

PRIOR ART DOCUMENT

Patent Document

Patent Document 1: JP 2004-072932A

SUMMARY OF THE INVENTION

Problems to be Solved

Meanwhile, if the corrugated tube is inserted excessively toward the back of the wire lead-out port, the routing length of the wire harness that is led out from the wire lead-out port becomes shorter than a predetermined length, which may result in a problem in that a fixing clip attached to the wire harness will not coincide with a locking hole of a vehicle body panel or the like. For this reason, the wire lead-out port described in Patent Document 1 adopts a structure in which a stopper protruding from the inner circumferential surface at a larger protruding height than the arc-shaped fitting projections is provided at a portion located at the back of the wire lead-out port, and the end of the corrugated tube comes into abutment against the stopper, thus preventing the corrugated tube from excessively penetrating into the wire lead-out port.

However, when such a stopper is provided protruding from the inner circumferential surface of the wire lead-out port, the protruding end face of the stopper will protrude radially inward by an amount exceeding the inner radius dimension of the corrugated tube. Consequently, the protruding end face of the stopper is likely to come into contact with the wire harness extending from an end face of the corrugated tube toward the back, and thus, wear or the like of the wire harness may occur.

The present invention has been made in light of the above-described circumstances, and a problem to be solved by the invention is to provide a vehicle-mounted component including a wire lead-out port with a novel structure that can reduce or eliminate the interference with a wire harness, while reliably limiting the amount of penetration of a wire lead-out port into a corrugated tube.

Means to Solve the Problem

As a result of the studies conducted by the present inventors as to the reasons for the occurrence of wear of the wire harness, it has become clear that the wear is caused by the leading end of the stopper interfering with the wire harness in the conventional harness protectors.

Therefore, the present inventors have investigated the stopper configuration that can suppress wear and limit the movement of the corrugated tube. As a result, the inventors have found a configuration in which the width dimension of the stopper is larger than that of the valley portions of the corrugated tube. This configuration prevents the corrugated tube from penetrating to the back of the harness protector beyond the stopper. Accordingly, a harness protector according to the present invention can reduce the interference between the corrugated tube and the stopper, while allowing the corrugated tube to penetrate to a desired position inside the harness protector, thus suppressing the wear of the wire harness.

The present invention provides
a harness protector that is mounted, in use, to a wire harness including, on an outer circumference thereof, a corrugated tube including a series of ridge portions and valley portions, the harness protector including
a wire lead-out port serving as an inlet/outlet of the wire harness,
wherein protrusions and a stopper protrude from an inner circumferential surface of the wire lead-out port,
the protrusions are configured to be fitted to the valley portions, and
the stopper has a larger width dimension at a protruding end face thereof than a width dimension of the valley portions.

In addition, the present invention provides
a harness protector that is mounted, in use, to a wire harness including, on an outer circumference thereof, a corrugated tube including a series of ridge portions and valley portions, the harness protector including
a wire lead-out port serving as an inlet/outlet of the wire harness,
wherein protrusions and a stopper protrude from an inner circumferential surface of the wire lead-out port,
the protrusions are configured to be fitted to the valley portions, and
the stopper has a larger width dimension at a basal portion thereof than a width dimension of the valley portions.

Effect of the Invention

The present invention provides a harness protector that can reduce the interference between a corrugated tube and a harness protector, while allowing the corrugated tube to penetrate to a desired position inside the harness protector, thus suppressing the wear of the wire harness.

BRIEF DESCRIPTION OF THE DRAWINGS

The above and other objects, advantages and features of the present invention will become more apparent from the following description of certain preferred embodiments taken in conjunction with the accompanying drawings.

DETAILED DESCRIPTION TO EXECUTE THE INVENTION

Figure 1:
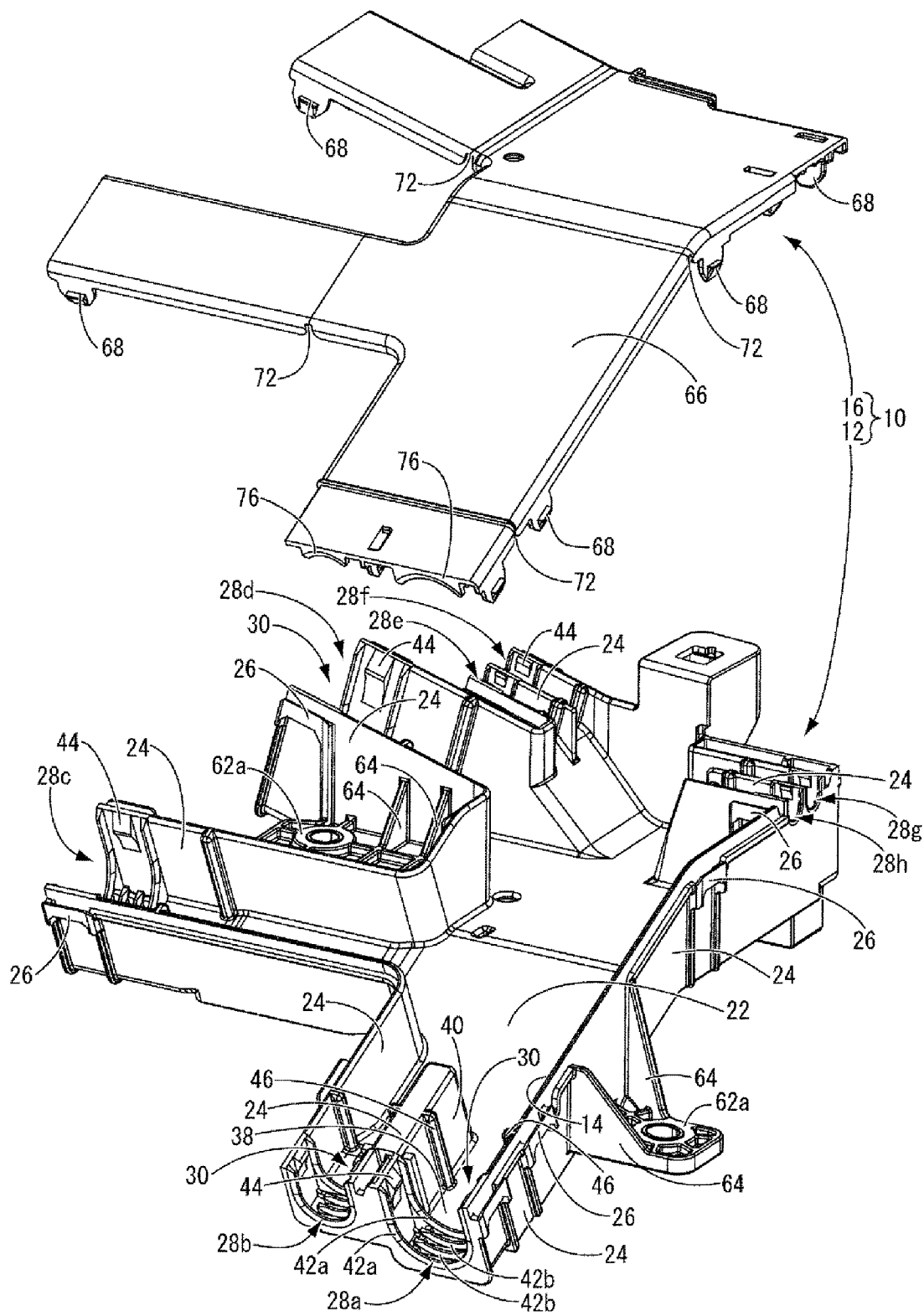
FIG. 1 is an exploded perspective view showing a vehicle-mounted component including a wire lead-out port according to an embodiment of the present invention.

Hereinafter, an embodiment of the present invention will be described with reference to the drawings. Note that in all of the drawings, the same constituent elements are denoted by the same reference numerals, and descriptions thereof have been omitted where appropriate. Note that the expression "A to B" used herein in connection with a numerical range means "A or more and B or less (greater than or equal to A and less than or equal to B)" unless otherwise specified.

A harness protector according to the present embodiment is mounted, in use, to a wire harness including, on an outer circumference thereof, a corrugated tube including a series of ridge portions and valley portions, the harness protector including a wire lead-out port serving as an inlet/outlet of the wire harness, wherein protrusions and a stopper protrude from an inner circumferential surface of the wire lead-out port, the protrusions are configured to be fitted to the valley portions, and the stopper has a larger width dimension at a protruding end face thereof than a width dimension of the valley portions.

In addition, a harness protector according to the present embodiment, is mounted, in use, to a wire harness including, on an outer circumference thereof, a corrugated tube including a series of ridge portions and valley portions, the harness protector including a wire lead-out port serving as an inlet/outlet of the wire harness, wherein protrusions and a stopper protrude from an inner circumferential surface of the wire lead-out port, the protrusions are configured to be fitted to the valley portions, and the stopper has a larger width dimension at a basal portion thereof than a width dimension of the valley portions.

(Applications of Harness Protector 10)

A vehicle-mounted component according to the present embodiment is a harness protector used for limiting the movement of a wire harness and protecting the wire harness. Accordingly, the vehicle-mounted component according to the present embodiment is preferable in that it can suppress the wear of a wire harness for which it is difficult to secure a placement space, or a wire harness for which it is necessary to avoid the interference with the surrounding components.

The vehicle-mounted component according to the present embodiment can be effectively used for limiting the movement of an engine wire harness and protecting the engine wire harness, for example. An engine wire harness has a greater limitation than other automobile wire harnesses on the space in which the wire harness is placed, and is subjected to vibration applied from the engine. Accordingly, the engine wire harness experiences heavier wear than other automobile wire harnesses, and there is demand to suppress the wear of the engine wire harnesses. For such an engine wire harness, it is preferable to use the vehicle-mounted component according to the present embodiment as a harness protector because the wear of the wire harness can be suitably suppressed.

(Harness Protector 10)

FIGS. 1 to 5 show a harness protector 10, which is a vehicle-mounted component including a wire lead-out port, according to an embodiment of the present invention. The harness protector 10 includes a protector body 12 extending in the shape of a trough, and a lid body 16 that covers an upper opening 14 of the protector body 12. In the present embodiment, "trough" is intended to mean a groove that is cross-sectionally semicircular arc, concave, V-shaped, or inverse trapezoidal, and is open at the top, and a combination of such grooves.

When in use, such a harness protector 10 houses a wire harness 18 passed through a protector body 12.

Figure 4:
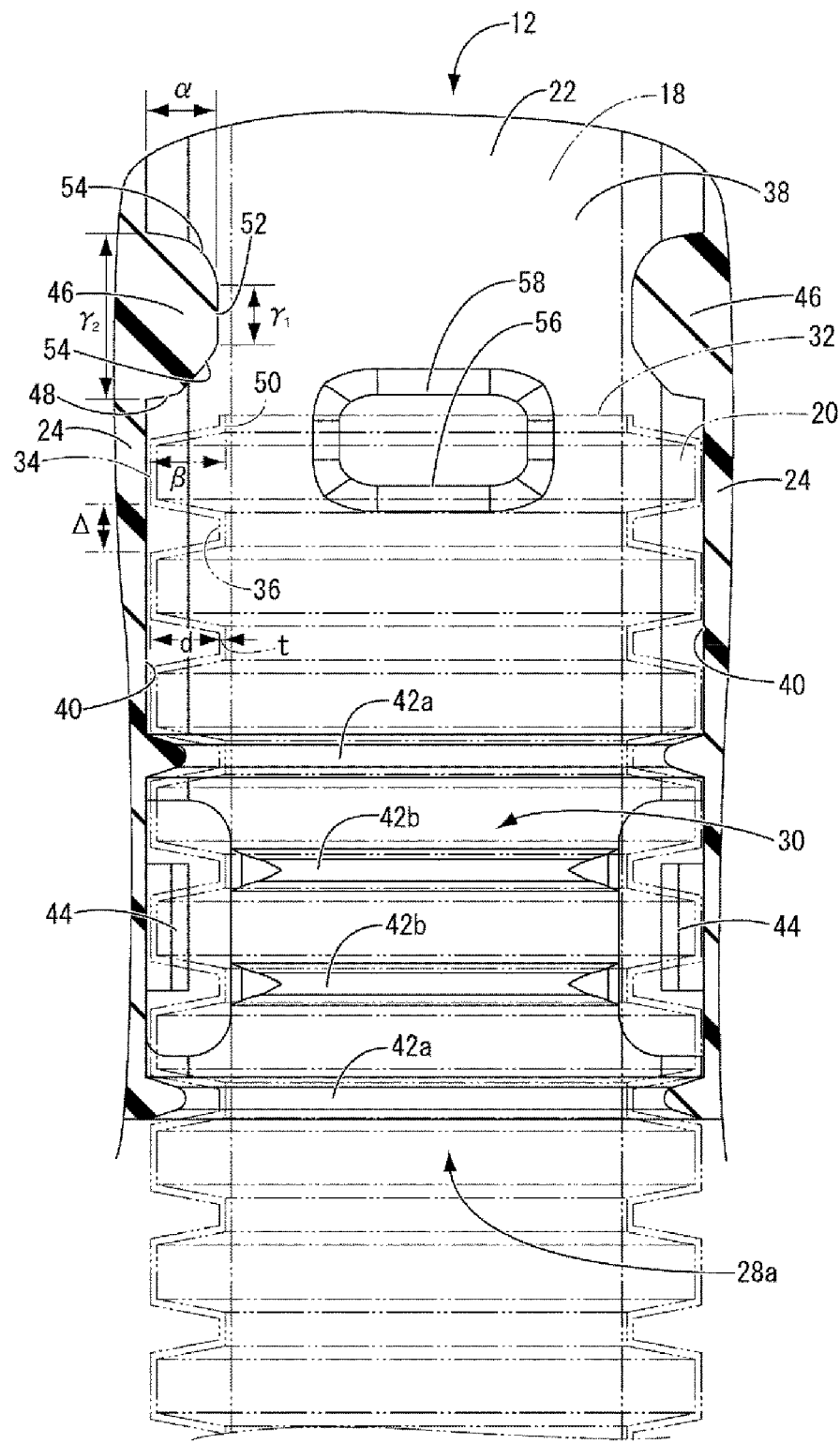
FIG. 4 is an enlarged cross-sectional view taken along the line IV-IV in FIG. 2.

To facilitate understanding, the wire harness 18 and a corrugated tube 20 externally fitted to the wire harness 18 are depicted by phantom lines only in FIG. 4. In the following description, "upward" refers to the upward direction in FIGS. 1 and 2, and "downward" refers to the downward direction in FIGS. 1 and 2.

(Protector Body 12)

Figure 3:
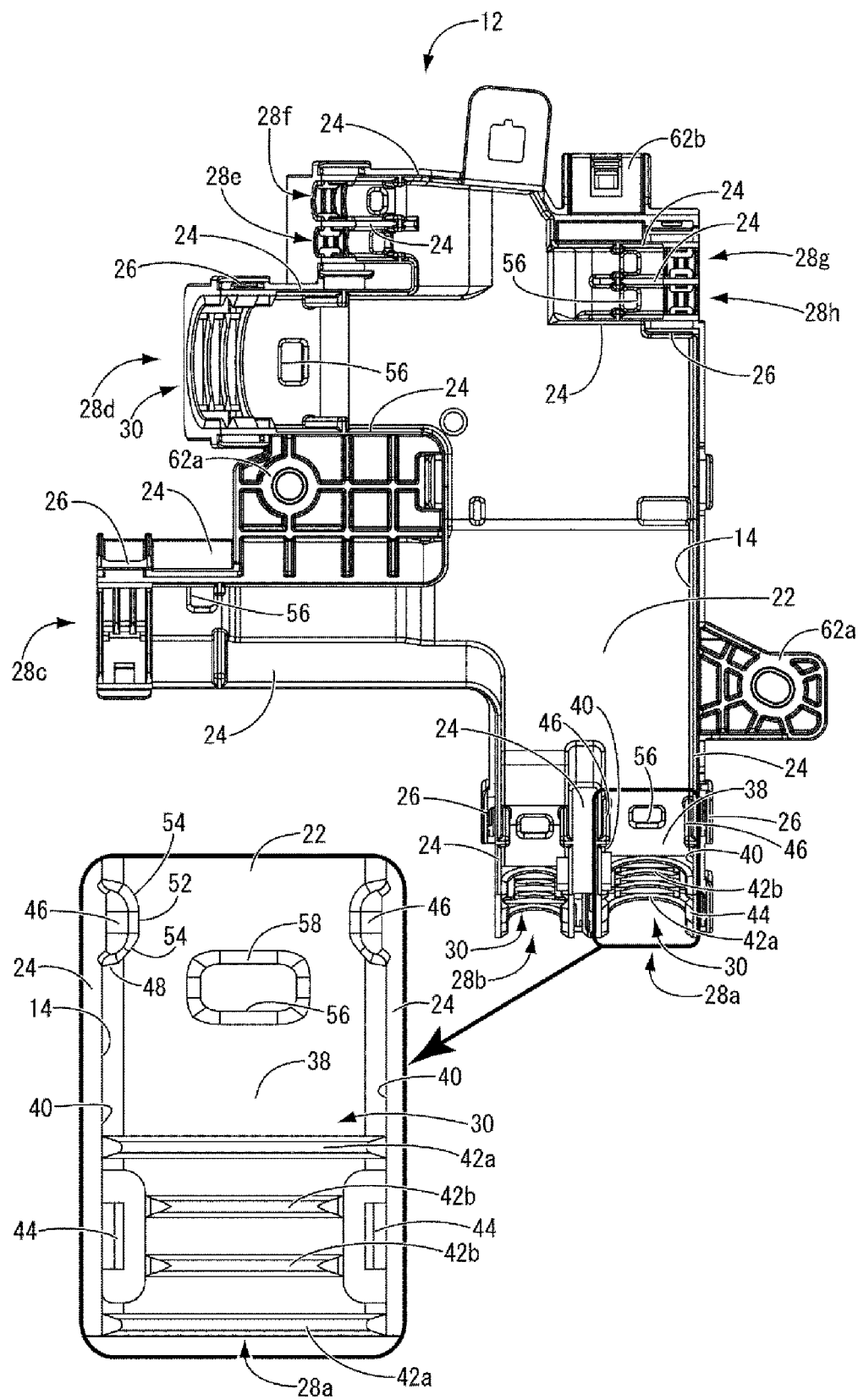
FIG. 3 is a plan view showing a protector body according to the present embodiment shown in FIG. 1 (the inserted partial enlarged view shows a plan view of a bottom wall, as viewed from above in the vertical direction).

As shown in FIGS. 1 and 3, the protector body 12 includes a bottom wall 22, and a pair of side walls 24 and 24 standing up from opposite sides of the bottom wall 22, and extends in the shape of a trough in the vertical and horizontal directions in a plan view (see FIG. 3).

The protector body 12 is formed, for example, as a single piece through injection molding or the like using a synthetic resin such as polypropylene (PP) or polyamide (PA). Note that there is no limitation on attaching a component separate from the protector body 12 to the protector body 12 according to the position, the shape, and the application of the protector.

Engaging frame bodies 26 having a substantially square-bracket shape in a plan view and protruding outward are provided at suitable locations above outer surfaces of the side walls 24 of the protector body 12. As a result of such engaging frame bodies 26 being respectively engaged with engaging pieces 68, which will be described below, provided on suitable locations of the lid body 16, a state in which the upper opening 14 of the protector body 12 is covered by the lid body 16 is stably maintained. Although a total number of 14 engaging frame bodies 26 are provided in FIG. 3, any number of engaging frame bodies 26 may be provided as needed so as to be spaced apart from each other in the length direction of the side walls 24.

As shown in FIGS. 1 to 5, in the harness protector 10, wire lead-out ports 28a to 28h are respectively formed at eight portions that are open outward, each have a hollow cylindrical shape, and led out from each thereof is a wire harness 18 with a corrugated tube 20 externally fitted thereto. Such wire lead-out ports 28a to 28h each have a trough-shaped housing portion 30 provided in the protector body 12. Each housing portion 30 is formed over a predetermined dimension in the axial direction of the corresponding one of the wire lead-out ports 28a to 28h. The housing portions 30 each include a bottom wall 22 that forms an inner circumferential surface of the corresponding one of the wire lead-out ports 28a to 28h, and a pair of side walls 24 and 24 protruding upward from opposite edge portions of the bottom wall 22 in the width direction thereof. Also, out of the wire lead-out ports 28a to 28h of the protector body 12, pairs of the wire lead-out ports 28a and 28b, the wire lead-out ports 28e and 28f, and the wire lead-out ports 28g and 28h are each formed as a single piece as a result of the side walls 24 disposed adjacent to each other in an axial orthogonal direction, which is orthogonal to the axial direction of the corresponding wire lead-out ports, being coupled to each other. Here, the wire lead-out ports 28a to 28h have basically the same structure except for their different sizes, and therefore, the wire lead-out port 28a will be described in detail as an example.

In FIGS. 1 to 5, a protector body 12 including a total number of eight wire lead-out ports 28a to 28h is depicted. Any number of wire lead-out ports may be provided according to the arrangement and the number of wire harnesses that are to be protected.

(Corrugated Tube 20)

As shown in FIG. 4, a leading end face 32 of the corrugated tube 20 externally fitted to the wire harness 18 is fixed to the wire lead-out port 28a of the protector body 12.

Here, the corrugated tube 20 has a hollow cylindrical structure. For example, a wire harness 18 formed by a bundle of wires bound together with a binding tape such as plastic tape is inserted into the corrugated tube 20.

The corrugated tube 20 has a structure in which annularly extending ridge portions 34 and valley portions 36 are alternately connected in the axial direction (the vertical direction in FIG. 4).

(Protrusions 42a and 42b)

As shown in FIGS. 3 and 4, in the housing portion 30 of the wire lead-out port 28a, on an axially distal end side (the lower end side in FIGS. 3 and 4), which is a distal end side of the wire lead-out port 28a in the axial direction, of the housing portion 30, protrusions 42a and 42b configured to be fitted to the valley portions 36 of the corrugated tube 20 are provided protruding inward from a bottom surface 38 of the bottom wall 22 that forms the inner circumferential surface, and inner surfaces 40 of the pair of side walls 24 and 24. More specifically, the protrusions 42a are each formed extending in a substantially arc shape over substantially the entire lengths of the bottom surface 38 of the bottom wall 22 and the inner surfaces 40 of the pair of side walls 24 and 24 in the axial orthogonal direction (the horizontal direction in FIGS. 3 and 4) of the wire lead-out port 28a. Such protrusions 42a are provided in substantially the same shape at two locations spaced apart from each other in the axial direction of the wire lead-out port 28a. On the other hand, the protrusions 42b are formed between the protrusions 42a formed at the two locations, and extend in a substantially arc shape over substantially the entire length of the bottom surface 38 of the bottom wall 22 in the axial orthogonal direction (the horizontal direction in FIG. 4) of the wire lead-out port 28a. Such protrusions 42b are also provided in substantially the same shape at two locations spaced apart from each other in the axial direction of the wire lead-out port 28a. Thus, on the axially distal end side of the wire lead-out port 28a of the housing portion 30, the protrusions 42a and 42b are provided protruding from at least the bottom surface 38 of the bottom wall 22. Furthermore, in the axial direction of the wire lead-out port 28a, a pair of retaining projections 44 and 44 having a substantially triangular cross sectional shape and protruding gradually inward in the axial orthogonal direction toward the upper side are provided at upper end portions of the inner surfaces 40 of the pair of side walls 24 and 24 at substantially the same positions as the protrusions 42b and 42b provided at the two locations. As shown in FIG. 4, when the leading end face 32 of the corrugated tube 20 is fixed to the wire lead-out port 28a, the ridge portions 34 of the corrugated tube 20 are placed on the bottom surface 38 of the bottom wall 22 that forms the inner circumferential surface of the wire lead-out port 28a and the inner surfaces 40 of the pair of side walls 24 and 24, and the valley portions 36 of the corrugated tube 20 are fitted to the protrusions 42a and 42b. Moreover, the pair of retaining projections 44 and 44 press the ridge portions 34 that form an outer circumferential surface of the corrugated tube 20, whereby the ridge portions 34 of the corrugated tube 20 are kept placed on the bottom surface 38 of the bottom wall 22 and the inner surfaces 40 of the pair of side walls 24 and 24 that constitute the inner circumferential surface of the wire lead-out port 28a.

(Stoppers 46)

A pair of stoppers 46 and 46 protruding inward in a cross-sectional shape with substantially rounded corners from the inner surfaces 40 of the pair of side walls 24 and 24 that form the inner circumferential surface, and extending over substantially the entire length of the inner surfaces 40 of the pair of side walls 24 and 24 in the height direction are provided on the inner side (the upper side in FIGS. 3 and 4) than the protrusions 42a and 42b in the axial direction of the wire lead-out port 28a. That is, in the housing portion 30 of the wire lead-out port 28a, on an axially proximal end side (the upper side in FIGS. 3 and 4), which is a proximal end side of the wire lead-out port 28a in the axial direction, of the housing portion 30, the stoppers 46 are provided protruding from the inner surfaces 40 of the pair of side walls 24 and 24, whereas the stoppers 46 are not provided protruding from the bottom surface 38 of the bottom wall 22. As a result, when the leading end face 32 of the corrugated tube 20 is fixed to the wire lead-out port 28a, the leading end face 32 of the corrugated tube 20 abuts against leading end faces 48 of the stoppers 46, whereby the amount of penetration of the corrugated tube 20 toward the back (upward in FIG. 4) of the wire lead-out port 28a is limited, as shown in FIG. 4.

The shape of the stopper 46 will be described in further detail.

As shown in FIG. 4, a height dimension $\alpha$ of the stoppers 46 from the side walls 24 that form the inner circumferential surface is set to be less than or equal to a height dimension $\beta$ of an inner circumferential surface 50 of the corrugated tube 20 from the side walls 24 in a state in which the ridge portions 34 of the corrugated tube 20 are placed on the side walls 24 that form the inner circumferential surface of the wire lead-out port 28a. That is, $\alpha \leq \beta$. In other words, the height dimension $\alpha$ of the stoppers 46 is set to be less than or equal to the total value of a depth dimension d of the valley portions 36 of the corrugated tube 20 and a thickness dimension t (see FIG. 4) of the bottom wall of the valley portions 36 ($\alpha \leq d+t$).

Preferably, a width dimension $\gamma_1$ (see FIG. 4), which is the dimension in the axial direction of the wire lead-out port 28a, of the stoppers 46 at protruding end faces 52 is larger than the width dimension $\Delta$ of the opening end portions of the valley portions 36 of the corrugated tube 20, for example. This makes it possible to suitably suppress penetration of the corrugated tube 20 to the back of the harness protector 10 beyond the stoppers 46.

Preferably, the width dimension $\gamma_2$ (see FIG. 4) of each stopper 46 at a basal portion thereof is larger than the width dimension $\Delta$ of the valley portions 36 of the corrugated tube 20, for example.

The lower limit of the width dimension $\gamma_2$ of the stopper 46 at the basal portion is, for example, preferably, 1.5 times or more, more preferably 1.75 times or more, still more preferably 2.0 times or more, even more preferably 2.25 times or more, and particularly preferably 2.5 times or more, relative to the width dimension $\Delta$ of the valley portions 36 of the corrugated tube 20. This makes it possible to reliably suppress penetration of the corrugated tube 20 to the back of the harness protector 10 beyond the stoppers 46.

The upper limit of the width dimension $\gamma_2$ of each stopper 46 at the basal portion may be, for example, 5.0 times or less, or 4.0 times or less, relative to the width dimension $\Delta$ of the valley portions 36 of the corrugated tube 20.

Preferably, opposite edge portions 54 and 54 of each stopper 46 at the protruding end face 52 in the axial direction of the wire lead-out port 28a have a chamfered shape.

It is possible to use any known chamfers as the chamfered shape of the stopper 46, such as a light chamfer, a C-chamfer, or an R-chamfer. The chamfered shape is preferably an R-chamfer, for example.

The lower limit of the size of the chamfer of the stopper 46 is, for example, preferably 0.1 mm or more, more preferably 0.2 mm or more, still more preferably 0.3 mm or more, even more preferably 0.4 mm or more, and particularly preferably 0.5 mm or more. The upper limit of the size of the chamfer of the stopper 46 may be, for example, 3.0 mm or less, or 2.5 mm or less. Note that the size of the chamfer refers to the length of the two sides forming a corner that is cut out through chamfering, from that corner, and corresponds to a dimensional numerical value added after the supplementary symbol "C", which represents C-chamfer, or the supplementary symbol "R", which represents R-chamfer, in the dimensional indication in accordance with the JIS standard.

By appropriately setting the chamfered shape and the chamfer size of the stoppers 46 in the above-described manner, it is possible to suppress the wear of the wire harness 18 even if the wire harness 18 comes into contact with the stoppers 46.

(Viewing Window 56)

A viewing window 56 is provided extending through the bottom surface 38 of the bottom wall 22, for example.

As shown in FIG. 4, a viewing window 56 having a substantially rectangular cross-sectional shape in a plan view is provided extending through the bottom surface 38 of the bottom wall 22 on the axially proximal end side (the upper side in FIGS. 3 and 4) of the housing portion 30 of the wire lead-out port 28a.

In the present embodiment, an edge portion 58 of the viewing window 56 that is located inward (upward in FIG. 4) in the axial direction of the wire lead-out port 28a is formed at substantially the same position in the axial direction (the vertical direction in FIG. 4) as the leading end face 48 of each stopper 46 that is located outward (downward in FIG. 4) in the axial direction of the wire lead-out port 28a. Accordingly, in a state in which the harness protector 10 is mounted, it is possible to easily confirm, from the viewing window 56, that the leading end face 32 of the corrugated tube 20 has not moved inward (upward in FIG. 4) beyond the stoppers 46.

(Attachment Portions 62a, 62b)

Figure 2:
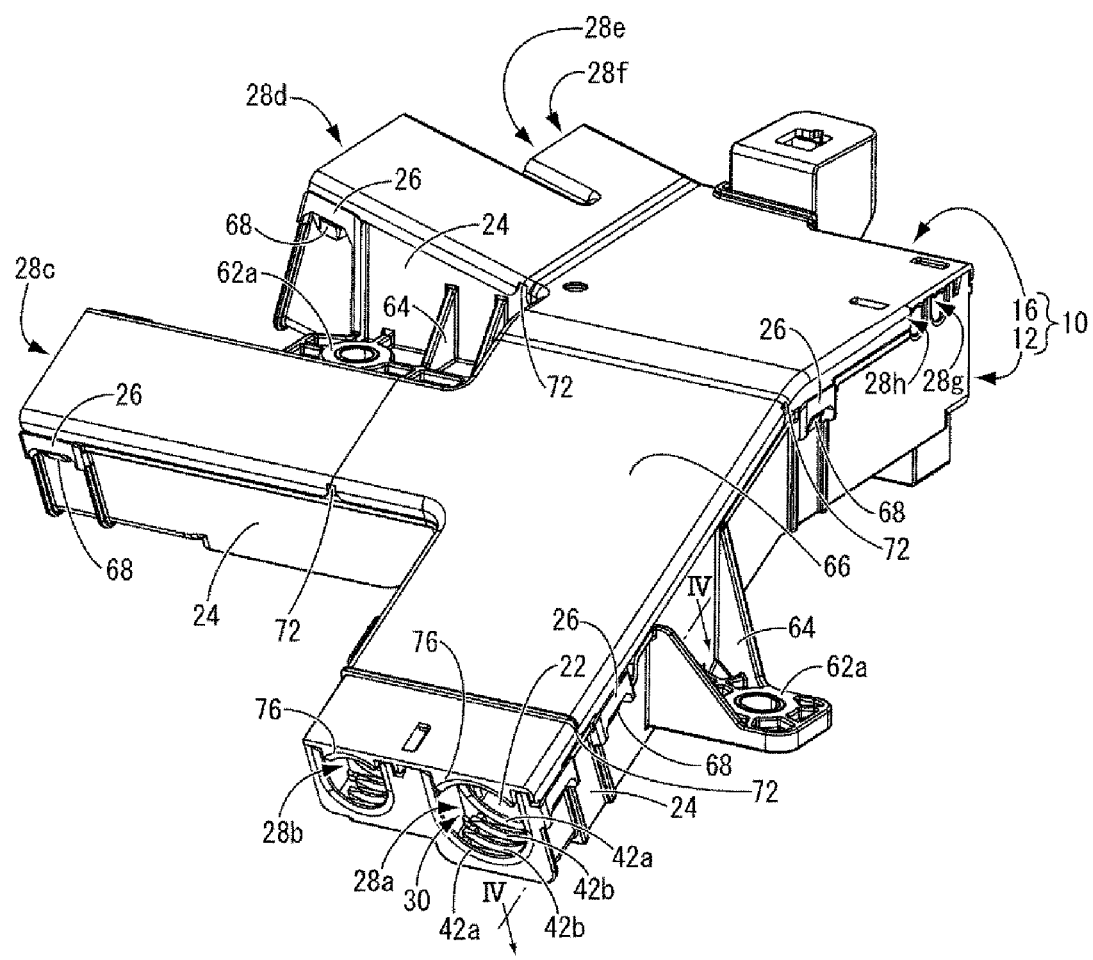
FIG. 2 is an overall perspective view showing a mounted state of the vehicle-mounted component including the wire lead-out port according to the present embodiment shown in FIG. 1.

As shown in FIGS. 1 to 3, attachment portions 62a having a substantially rectangular flat plate shape in a plan view (see FIG. 3) and being configured to be fixed, for example, to a bracket or the like (not shown) are provided protruding from between the outer surfaces of the side walls 24 of the wire lead-out ports 28c and 28d, and the outer surface of the side wall 24 of the wire lead-out port 28a that is spaced apart from the wire lead-out port 28b on the proximal end side (the upper side in FIG. 3). Between each of such attachment portions 62a and the side wall 24 from which the attachment portion 62a protrudes, a coupling portion 64 having a substantially triangular shape (see FIG. 3) and configured to couple these two members are provided. Accordingly, even when a load is applied to the attachment portion 62a, the strength required to maintain the connection between the attachment portion 62a and the protector body 12 is secured.

An attachment portion 62b having a substantially square-bracket shape in a plan view for being fixed, for example, to an automobile member such as a bracket (not shown) is provided protruding from the outer surface of the side wall 24 of the wire lead-out port 28g that is spaced apart from the wire lead-out port 28h (see FIG. 3).

(Engaging Pieces 68)

As shown in FIGS. 1 and 2, the lid body 16 includes a flat plate-shaped top wall 66 having substantially the same shape as the protector body 12 in a plan view. On edge portions of such a top wall 66, a plurality of engaging pieces 68 having a substantially rectangular shape and protruding downward are formed so as to be capable of undergoing bending deformation in the plate thickness direction. As a result of such engaging pieces 68 being engaged with the engaging frame bodies 26 provided on the protector body 12, a state in which the upper opening 14 of the protector body 12 is covered by the lid body 16 is stably maintained.

In the present embodiment, the engaging pieces 68 are formed at 14 locations corresponding to the engaging frame bodies 26 described above. The numbers of engaging pieces 68 and engaging frame bodies 26 can be appropriately set according to the number of wire harnesses to be inserted into the protector, and the branching configuration thereof.

(Lid Body 16)

As in the case of the protector body 12, the lid body 16 is formed, for example, as a single piece through injection molding or the like using a synthetic resin such as polypropylene (PP) or polyamide (PA). Also, the lid body 16 is molded separately from the protector body 12, for example.

Furthermore, as shown in FIG. 1, the lid body 16 has a configuration in which the top wall 66 is divided into six parts by thin hinge portions 72, and the divided parts are hingedly connected via the hinge portions 72.

The number of parts into which the lid body 16 is divided is not limited. For example, it is preferable that the lid body 16 is divided into two or more parts. From the viewpoint of improving the workability in fitting the lid body 16 to the protector body 12, it is more preferable that the lid body 16 is divided such that each of the divided parts of the lid body 16 includes four or a smaller number of hinge portions 72. In the present embodiment, "to divide" is intended to mean that the region of the top wall 66 is divided by portions of the top wall 66 that are bent. This provides good workability because the engaging frame bodies 26 and the engaging pieces 68 that are formed at 14 locations do not need to be engaged with each other simultaneously, and the engagement may be performed for each region of the top wall 66 divided by the hinge portions 72.

(Protrusions 76 of Lid Body 16)

Figure 5:
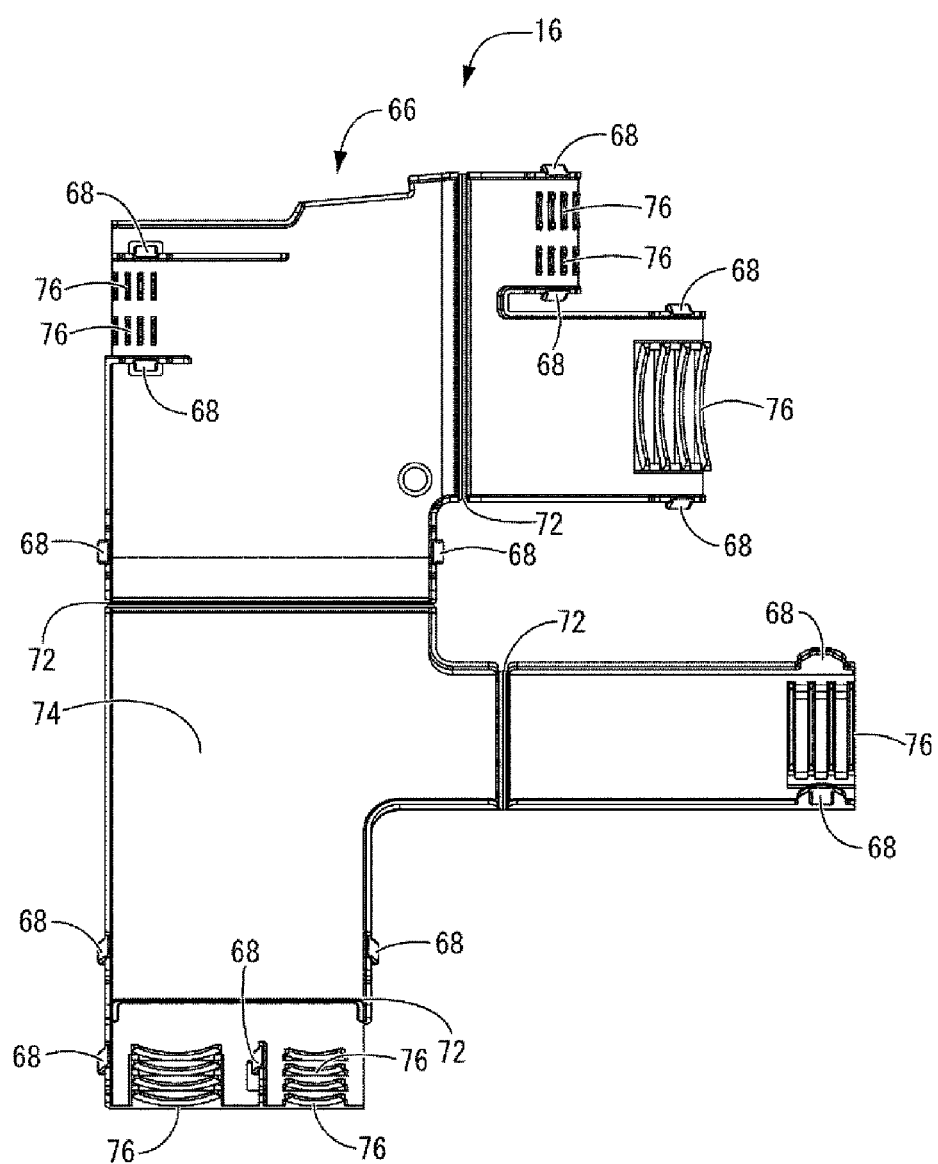
FIG. 5 is a bottom view showing a lid body according to the present embodiment shown in FIG. 1.

As shown in FIG. 5, at the same position in a plan view corresponding to the protrusions 42a and 42b provided on the wire lead-out ports 28a to 28h of the protector body 12 described above on a lower surface 74 of the top wall 66 of the lid body 16, protrusions 76 extending in directions corresponding to the protrusions 42a and 42b are provided protruding downward from the lower surface 74 of the top wall 66. Accordingly, by covering the upper opening 14 of the wire lead-out ports 28a to 28h of the protector body 12 by the lid body 16, the protrusions 42a and 42b of the protector body 12 and the protrusions 76 of the lid body 16 can be fitted to the valley portions 36 located at an end of the corrugated tube 20, whereby the corrugated tube 20 can be stably housed and held relative to the wire lead-out port 28a of the harness protector 10. Moreover, the protrusions 42a and 42b and 76 allow the corrugated tube 20 to be stably held vertically and horizontally in the wire lead-out ports 28a to 28h. Although the present embodiment has described the wire lead-out port 28a as an example, it is also possible to provide the same configuration and the same effect resulting therefrom for the other wire lead-out ports 28b to 28h.

(Harness Protector 10)

With the harness protector 10 having such a structure according to the present embodiment, the height dimension $\alpha$ of the stoppers 46 from the side walls 24 is set to not exceed the height dimension $\beta$ of the inner circumferential surface 50 of the corrugated tube 20 from the side walls 24 in a state in which the ridge portions 34 of the corrugated tube 20 are placed on the side walls 24. Accordingly, the protruding end face 52 of each stopper 46 will not protrude to the inner circumference side beyond the inner circumferential surface of the corrugated tube 20, and it is possible to prevent the stoppers 46 from interfering with the wire harness 18 extending from the leading end face 32 of the corrugated tube 20 toward the back, whereby the problem of wear or the like of the wire harness 18 can be reduced or eliminated. Moreover, since the opposite edge portions 54 and 54 of the stopper 46 at the protruding end face 52 are chamfered, it is possible to further reduce the problem of wear or the like caused by interference between the wire harness 18 and the stopper 46.

In the present embodiment, the protruding end face 52 of the stopper 46 has a width dimension $\gamma_1$ larger than the width dimension $\Delta$ of the valley portions 36 of the corrugated tube 20, and therefore, a wide flat surface can be left on the protruding end face 52 of the stopper 46 even when the opposite edge portions 54 and 54 are chamfered. Therefore, it is possible to advantageously prevent the conventional problem of generation of a sharp corner portion at the protruding end face of the stopper.

The width dimension $\gamma_1$, which is the dimension in the axial direction of the wire lead-out ports 28a to 28h, of the stoppers 46 at the protruding end faces 52 is set to be larger than the width dimension $\Delta$ of the valley portions 36 of the corrugated tube 20. Accordingly, even when the height dimension $\alpha$ of the stopper 46 from the side wall 24 is reduced to be smaller than those of the conventional structures, the protruding end face 52 of the stopper 46 cannot penetrate into the valley portion 36 of the corrugated tube 20. Therefore, it is possible to reduce or eliminate the problem of interference between the stopper 46 and the corrugated tube 20, while reliably limiting the amount of penetration of the corrugated tube 20 into the wire lead-out ports 28a to 28h. Furthermore, the stoppers 46 are not provided protruding from the bottom walls 22 of the wire lead-out ports 28a to 28h. Accordingly, it is also possible to advantageously solve the problem that the wire harness 18 repeatedly abuts against the stoppers 46 and generates an unusual sound or causes wear to the wire harness 18 when the wire harness 18 vibrates in the vertical direction, which is the main vibration direction.

Additionally, since the stoppers 46 are not provided protruding from the bottom walls 22 of the wire lead-out ports 28a to 28h, the viewing windows 56 can be provided at a high degree of freedom of design using such bottom walls 22. Also, the viewing windows 56 provided in the bottom walls 22 can also serve as drain gutters for discharging water or the like entering the wire lead-out ports 28a to 28h. Moreover, since the stoppers 46 or the like are not provided on the bottom walls 22, the possibility that water droplets stay between the corrugated tube 20 and the bottom walls 22 due to capillary action or the like is also reduced, thus realizing quick drainage from the viewing windows 56.

(Harness Assembly)

The harness protector according to the present embodiment can be used as a harness assembly including a harness protector and a wire harness, for example.

As the wire harness, it is possible to use, for example, a wire harness including a connector, without any limitation. In the case of using a wire harness including a connector, some of the wire lead-out ports and the connector may be fitted to each other. In this case, the harness protector according to the present embodiment can exhibit the performance as a connector cover, for example. This is preferable in that it is possible to protect the connector in a reduced space, while limiting the movement of the wire harness and reducing the wear of the wire harness.

Although a plurality of embodiments of the present invention have been described above in detail, the present invention is not intended to be limited by the specific descriptions thereof. Modifications, improvements, and the like in a range in which the object of the present invention can be achieved are encompassed by the present invention. For example, the numbers of the protrusions 42a of the wire lead-out ports 28a to 28h is not limited to those shown as examples. In the above-described embodiment, the protrusions 42a are provided over the bottom surface 38 of the bottom wall 22 and the inner surfaces 40 of the pair of side walls 24 and 24. However, the protrusions 42a may be provided on any of these surfaces, and may preferably be provided on at least the bottom surface 38 of the bottom wall 22. Furthermore, in the above-described embodiment, the protrusions 42b are formed on the bottom surface 38 of the bottom wall 22 over substantially the entire length of the wire lead-out ports 28a to 28h in the axial orthogonal direction. However, the protrusions 42b may be provided on at least a portion thereof. The viewing window 56 may be provided in the vicinity of the stoppers 46, and may be provided so as to be displaced to the opening side of the wire lead-out ports 28a to 28h relative to the stoppers 46, or may be provided so as to be displaced to the side opposite to the opening side of the wire lead-out ports 28a to 28h.

Examples of a reference aspect will be additionally described below. In the reference aspect, examples in which the present invention is applied to a vehicle-mounted component including a harness protector are shown. The vehicle-mounted component includes, in addition to a harness protector, any vehicle-mounted component provided with a wire lead-out port, including, for example, power supply system modules such as a charging/discharging controller for a vehicle-mounted regenerative system, a battery wiring module, a relay box, an intelligent power distributor module, a junction box, and a power supply box; and engine control units (ECU) such as a gateway ECU and a body ECU.

1. A vehicle-mounted component including a wire lead-out port, from which a wire harness is led out in a state in which a corrugated tube including annular ridge portions and valley portions alternately connected in an axial direction is externally fitted to the wire harness, in which the ridge portions of the corrugated tube are placed on an inner circumferential surface of the wire lead-out port, and protrusions configured to be fitted to the valley portions are provided on the inner circumferential surface, a stopper that protrudes inward from the inner circumferential surface and is configured to abut against a leading end face of the corrugated tube so as to limit an amount of penetration of the corrugated tube into the wire lead-out port is provided protruding on an inner side than the protrusions in an axial direction of the wire lead-out port, a protruding dimension of the stopper from the inner circumferential surface is set to a dimension with which the stopper does not protrude to the inner circumference side beyond an inner circumferential surface of the corrugated tube in which the ridge portions are placed on the inner circumferential surface of the wire lead-out port, and a width dimension, which is a dimension in the axial direction, of the stopper at a protruding end face is set to be larger than a width dimension of the valley portions of the corrugated tube.

2. The vehicle-mounted component including the wire lead-out port according to 1, in which an edge portion of the stopper at the protruding end face is chamfered.

3. The vehicle-mounted component including the wire lead-out port according to 1 or 2, in which the wire lead-out port includes a housing portion having a trough shape and extending in the axial direction, and the housing portion includes a bottom wall that forms the inner circumferential surface of the wire lead-out port, and a pair of side walls protruding upward from opposite edge portions of the bottom wall in a width direction thereof, and the protrusions are provided protruding at least from the bottom wall on an axially distal end side of the housing portion, and the stopper is provided protruding from each of the pair of side walls, and the stopper is not provided protruding from the bottom wall on an axially proximal end side of the housing portion.

4. The vehicle-mounted component including the wire lead-out port according to 3, in which a viewing window is provided extending through the bottom wall on the axially proximal end side of the housing portion.

According to 1, on the inner circumferential surface of the wire lead-out port on which the ridge portions that form the outer circumferential surface of the corrugated tube are placed, the protrusions configured to be fitted to the valley portions of the corrugated tube are provided, and the stopper that is located inward of such protrusions in the axial direction of the wire lead-out port, and configured to abut against the leading end face of the corrugated tube so as to limit the amount of penetration of the corrugated tube into the wire lead-out port is provided protruding from the inner circumferential surface. Here, the protruding dimension, which corresponds to the height position of the protruding end face of the stopper, of the stopper from the inner circumferential surface is set to a dimension with which the stopper does not protrude to the inner circumference side beyond the inner circumferential surface of the corrugated tube in which the ridge portions are placed on the inner circumferential surface of the wire lead-out port. Accordingly, it is possible to advantageously reduce or eliminate the problem of wear or the like of the wire harness that can be caused as a result of the stopper interfering with the wire harness extend from the leading end portion of the corrugated tube toward the back.

Even when the protruding height of the stopper is reduced to be smaller than those of the conventional structures in this manner, the width dimension of the stopper provided protruding from the inner circumferential surface of the wire lead-out port is set to be larger than the width dimension of the valley portions of the corrugated tube. Accordingly, even if the leading end face of the corrugated tube is to penetrate inward in the axial direction of the wire lead-out port beyond the stopper, the leading end portion of the stopper cannot penetrate into the valley portions of the corrugated tube, whereby it is possible to prevent the inward movement of the corrugated tube. As a result, it is possible to reduce or eliminate the problem of interference between the stopper and the corrugated tube, while reliably limiting the amount of penetration of the corrugated tube into the wire lead-out port.

According to 2, the edge portion of the stopper at the protruding end face is chamfered, and therefore it is possible to further reduce the problem of interference between the stopper and the wire harness extending from the end portion of the corrugated tube toward the back. In particular, the protruding end face of the stopper has a larger width dimension than the width dimension of the valley portions of the corrugated tube. Accordingly, even when the edge portion is chamfered, a wide flat surface can be left on the protruding end face of the stopper, and therefore, it is possible to advantageously prevent the conventional problem of generation of a sharp corner portion at the protruding end face of the stopper. Note that a C-chamfer, a light chamfer, an R-chamfer, or the like may be used as the chamfered shape.

According to 3, the wire lead-out port includes the housing portion having a trough shape and extending in the axial direction of the wire lead-out port, whereby the wire harness and the corrugated tube externally fitted thereto can be stably housed and held.

Moreover, the protrusions configured to be fitted to the valley portions of the corrugated tube are provided protruding from at least the bottom wall on the axially distal end side of the housing portion, whereby the wire harness passed through the housing portion, and the corrugated tube can be stably supported from below.

Furthermore, on the axially proximal end side of the housing portion, the stopper is provided protruding from each of the pair of side walls, and the stopper is not provided protruding from the bottom wall. Accordingly, it is also possible to advantageously solve the problem that the wire harness repeatedly abuts against the stopper and generates unusual sounds or causes wear to the wire harness when the wire harness extending from the leading end face of the corrugated tube toward the back vibrates in the vertical direction, which is the main vibration direction.

According to 4, the stopper is not provided on the bottom wall on the axially proximal end side of the housing portion, and the viewing window can be provided effectively using such an empty space. Therefore, the viewing window can be provided at a high degree of freedom of design, and the alignment of the insertion end of the corrugated tube by the stopper can also be confirmed visually in a reliable manner.

Moreover, the viewing window provided on the bottom wall of the housing portion can also serve as a drain gutter for discharging water or the like entering the wire lead-out port. In that case, since the stopper or the like is not provided on the bottom wall, the possibility that water droplets stay between the corrugated tube and the bottom wall due to capillary action or the like is reduced, thus realizing quick drainage from the viewing window.

EXAMPLE

In the following, the present invention will be described using an example. However, the present invention is not limited thereto.

Example

As a harness protector 10 according to an example, the harness protector 10 shown in FIG. 1 was produced. As for the dimensions of the harness protector 10 of the example, the width dimension $\gamma_2$ of the stoppers 46 at the basal portion was 3.0 mm, and the inner diameter dimension of the stoppers 46 was 5.4 mm In addition, a corrugated tube 20 to be combined with the harness protector 10 of the example was prepared. The width dimension $\Delta$ of the valley portions 36 of the corrugated tube 20 was 1.2 mm, and the inner diameter dimension of the corrugated tube 20 was 5.4 mm.

In the corrugated tube 20 of the example, the protruding dimension of the stoppers 46 from the inner circumferential surface was a dimension with which the stoppers 46 did not protrude to the inner circumference side beyond the inner circumferential surface 50 of the corrugated tube 20. In addition, the width dimension $\gamma_2$ of the stoppers 46 at the basal portion was 2.5 times relative to the width dimension $\Delta$ of the valley portions 36 of the corrugated tube 20.

The wire harness 18 was passed through the corrugated tube 20, and the harness protector 10 of the example was combined therewith, thus forming a harness assembly according to the example.

As a result of mounting the harness assembly according to the example to an engine, it was confirmed that the wear of the wire harness was reduced as compared with the case where a conventional harness protector was used, and also that the corrugated tube was allowed to penetrate to a desired position inside the harness protector.

Note that the conventional harness protector is a harness protector in which the protruding dimension of the stoppers from the inner circumferential surface is such that the stoppers protrude to the inner circumference side beyond the inner circumferential surface of the corrugated tube, and the width dimensions of the stoppers at the protruding end face and the basal portion are smaller than the width dimension of the valley portions of the corrugated tube.

This application claims priority to Japanese Patent Application No. 2017-215320, filed on Nov. 8, 2017, the disclosure of which is incorporated in its entirety herein by reference.

What is claimed is:

1. A harness protector comprising
a wire lead-out port serving as an inlet/outlet of the wire harness mounted to a wire harness that includes, on an outer circumference thereof, a corrugated tube including a series of ridge portions and valley portions,
wherein protrusions and a stopper protrude from an inner circumferential surface of the wire lead-out port,
the protrusions are configured to be fitted to the valley portions, and
the stopper has a larger width dimension in an axial direction of the wire lead-out port at a protruding end face that is a top surface of the stopper than a width dimension of the valley portions.

2. A harness protector comprising
a wire lead-out port serving as an inlet/outlet of the wire harness mounted to a wire harness that includes, on an outer circumference thereof, a corrugated tube including a series of ridge portions and valley portions,
wherein protrusions and a stopper protrude from an inner circumferential surface of the wire lead-out port,
the protrusions are configured to be fitted to the valley portions,
the stopper has a larger width dimension at a basal portion that is a bottom surface of the stopper than a width dimension of the valley portions,
the wire lead-out port includes a housing portion that includes a bottom wall and side walls, and
the side walls include the stopper.

3. The harness protector according to claim 2,
wherein the width dimension of the stopper at the basal portion is 1.5 times or more and 5.0 times or less the width dimension of the valley portions of the corrugated tube.

4. The harness protector according to claim 2,
wherein the stopper has a protruding dimension with which the stopper does not protrude to the inner circumference side beyond the inner circumferential surface of the corrugated tube.

5. The harness protector according to claim 2,
wherein the protruding end face includes one or more chamfers selected from the group consisting of a light chamfer, a C-chamfer, and an R-chamfer.

6. The harness protector according to claim 5,
wherein the chamfer has a size of 0.1 mm or more and 3.0 mm or less.

7. The harness protector according to claim 2,
wherein the bottom wall includes the protrusions.

8. The harness protector according to claim 7,
wherein a viewing window is provided extending through the bottom wall.

9. The harness protector according to claim 2,
wherein the wire harness is an engine wire harness.

10. The harness protector according to claim 2, further comprising
a lid body,
wherein the lid body is divided into two or more parts.

11. A harness assembly comprising:
the harness protector according to claim 2; and
the wire harness.

12. The harness protector according to claim 1,
wherein the stopper has a protruding dimension with which the stopper does not protrude to the inner circumference side beyond the inner circumferential surface of the corrugated tube.

13. The harness protector according to claim 1,
wherein the protruding end face includes one or more chamfers selected from the group consisting of a light chamfer, a C-chamfer, and an R-chamfer.

14. The harness protector according to claim 13,
wherein the chamfer has a size of 0.1 mm or more and 3.0 mm or less.

15. The harness protector according to claim 1,
wherein the wire lead-out port further includes a housing portion,
the housing portion includes a bottom wall and side walls,
the bottom wall includes the protrusions, and
the side walls include the stopper.

16. The harness protector according to claim 15,
wherein a viewing window is provided extending through the bottom wall.

17. The harness protector according to claim 1,
wherein the wire harness is an engine wire harness.

18. The harness protector according to claim 1, further comprising
a lid body,
wherein the lid body is divided into two or more parts.

19. A harness assembly comprising:
the harness protector according to claim 1; and
the wire harness.

\* \* \* \* \*